Figure 1:
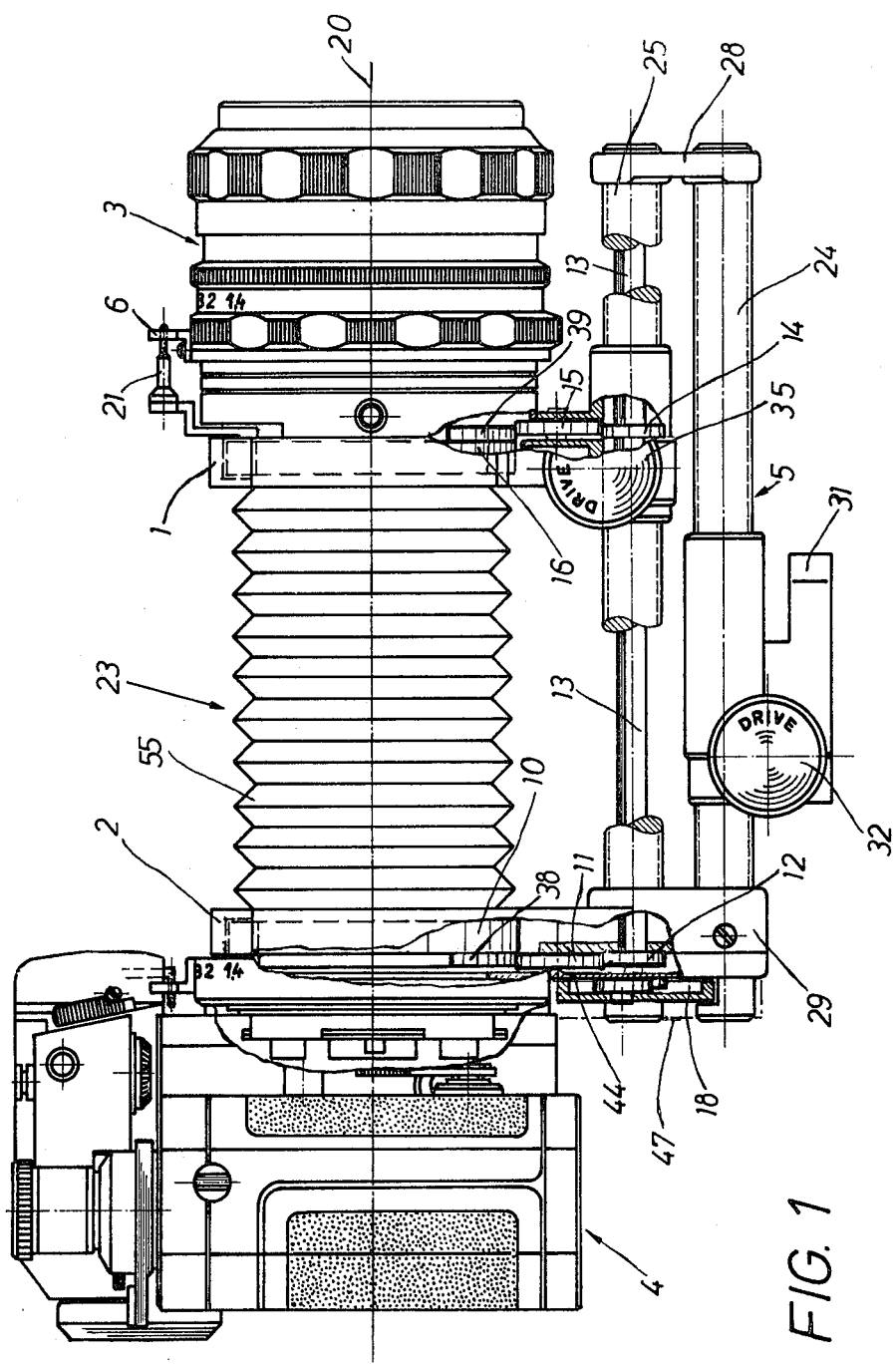

United States Patent [19] [11] 4,095,246
Kellner [45] June 13, 1978

[54] BELLOWS SETTING EQUIPMENT
[76] Inventor: Ferdinand Kellner, Buxach 14, 8940 Memmingen, Germany
[21] Appl. No.: 774,021
[22] Filed: Mar. 3, 1977
[30] Foreign Application Priority Data
Mar. 27, 1976 Germany ............................. 2613161
[51] Int. Cl.² ............................................. G03B 17/04
[52] U.S. Cl. .................................... 354/187; 354/272; 354/286
[58] Field of Search ............... 354/187, 194, 192, 193, 354/286, 272, 273, 196, 46, 158
[56] References Cited
U.S. PATENT DOCUMENTS
1,313,872  8/1919  Andrushes ........................... 354/273
2,236,925  4/1941  Steiner ................................. 354/158
2,351,834  6/1944  Phillips ................................ 354/196
3,987,472  10/1976 Saito .................................... 354/232

FOREIGN PATENT DOCUMENTS
1,522,248  8/1969  Germany ............................. 354/196

Primary Examiner—Edna M. O'Connor
Attorney, Agent, or Firm—Holman & Stern

[57] ABSTRACT

Equipment for the setting of the bellows between an objective and a camera. An arrangement is devised to reduce play and inaccuracy by the use of a control and operating member acting on an intermediate element of a gear train between the elements controlling the diaphragm setting at the objective and thus controlling the diaphragm setting at the camera.

10 Claims, 5 Drawing Figures

BELLOWS SETTING EQUIPMENT

The invention is concerned with setting equipment. More particularly it relates to bellows setting equipment for photographic cameras and to those of the kind comprising a front standard for mounting an objective, a rear standard for fastening to the camera, a guide frame carrying the two standards for relative movement to vary the distance between them, and an assembly for coupling the control elements of the diaphragm at the objective and that at the camera, this including a gear train on the standards and on the guide frame.

For convenience the invention is described below in relation to a bellows setting equipment but it will be understood that the invention in fact is fundamentally capable of being used with like results even for setting equipment of other constructions, for example with tubes.

In conventional instances, where a camera is combined with a bellows setting equipment, the objective is taken off the camera, for example is screwed off or unfastened by means of a bayonet connecting joint, and the camera is then mounted on the rear standard of the bellows setting equipment whilst the front standard takes the objective in appropriate fashion. The bellows extends between the two standards and these latter are movable relatively to one another on the guide frame.

There are cameras combined with bellows setting equipment in which the diaphragm figure set at the objective is signalled to the camera through special transmitting members for the purpose of setting the requisite exposure period, for example through a calculator there provided.

It will be apparent that bellows setting equipment for this purpose must appropriately couple the control elements to the objective and to the camera, to which end a gear train can be provided on the standards and on the guide frame. If the camera and the associated objective provide facilities for choosing a diaphragm value it is also necessary that the bellows setting equipment concerned installed for this purpose shall include a gear train which couples to one another the appropriate control elements in the objective and on the camera. When an exposure is made the diaphragm in the objective is set to the pre-selected value by the release button on the camera and, after exposure, the diaphragm is restored to the original open position by the shutter of the camera.

Where the objective is connected directly to the camera, that is to say where the use of bellows setting equipment is dispensed with, the control elements of the camera and the objective are usually coupled together, and the inevitable play is so small that it does not interfere with the proper functioning. In the case, however, of an interposed bellows setting equipment a gear train must be used for coupling the control elements of the diaphragm at the camera and at the objective and, since this gear train must also be adaptable to a change in the spacing between the two standards, it must be composed of a comparatively large number of members. This involves play between the individual members and this of course is augmented with the increase in number of the members until it reaches a quite notable value. The reduction of this play by high manufacturing precision is only possible to a limited degree and also at considerable added cost.

The play involved in the gear train is no handicap in cameras in which the cycle of movements, for example during exposure, is actively controlled from the camera. The individual members of this gear train adjoin one another at the initiation of the cycle of movement and no play becomes manifest. The mechanism of the camera merely has to be adequately stable and efficient to be capable of overcoming the resistances encountered.

Those movement transmitting members which cater for preselection of the diaphragm value and transmission of the preselected figure to the camera frequently involve further problems. In the case of a camera having a spring-pressed lever which bears against the relevant members it can also happen that the pre-set value is imparted correctly to the objective and without play to the camera. In this case again the individual members of the gear train are in direct engagement and since the setting of the objective is performed manually, any resistance involved by tight application of the individual members involves no difficulty.

There are known cameras and objectives in which no spring-pressed elements are used. Moreover the control elements on the camera and at the objective are so built that these remain in the set position in the case of non-operation.

The aforementioned play in the gear train at the bellows setting equipment leads to the result in such cameras that, for example during the setting of a specific diaphragm value at the objective, the corresponding control elements at the camera are only operated when the change in diaphragm setting which takes place is of greater value than that corresponding to the play. As a result the diaphragm setting at the camera lags unevenly behind the diaphragm setting at the objective. Particularly where an infinitely variable adjustment of the diaphragm is provided for, or where intermediate values between full diaphragm values is required and can be set, this condition is of disadvantage. However, even in the case of diaphragm values which can be adjusted stepwise it is not impossible that the adjusted diaphragm value at the objective might be a whole step different from that at the camera.

It is here to be noted that the differences ensuing from the uneven lagging of one control element relatively to the other control elements is dependent on that side from which a diaphragm value is to be adjusted. If for example the objective is to be adjusted from a maximum diaphragm value (for example 2.0) to the value 5.6 in the preselection of the diaphragm figure, this means another value for the setting of the adjusting elements at the camera from the case where the objective is adjusted from a small diaphragm value (for example 16) to this diaphragm value 5.6.

In the first case the camera assumes a diaphragm opening of more than 5.6, but in contrast in the second case, for the same reasons, it takes a smaller diaphragm opening. In both cases however the objective is set to the value 5.6.

The arrangement which caters for setting of the diaphragm value at the camera does not avoid the problem because, in a comparable way, the setting at the objective lags unevenly behind.

The object of the present invention is to improve a setting equipment, and particularly a bellows setting equipment of the type defined above, in such a way that without varying the amount of the servicing required, and in particular without increasing the manufacturing precision for the purpose of reducing the play in the gear train, it caters for an identical set diaphragm value in regard to the camera and in regard to the objective.

To this end, in setting equipment of the kind set forth the invention proposes the provision of a member for co-ordinated operation of the control elements referred to which acts on an intermediate element, for example a half-way element, of the gear train.

The invention is based on observation of the fact that the problem occasioned by the play in the gear train can be taken up by the central intermediate member of the gear train in the setting of the diaphragm value, and particularly a preselected value, at the objective. In an adjusting movement of the aforesaid operating member for the setting of a different diaphragm value, all the play is straight away disposed of and the control elements at the objective and at the camera, having overcome this play, are moved in the same sense and practically simultaneously. An adjustment in the other sense at the operating member has likewise the result that, in the first place the play in the gear members is disposed of and additionally the movement of adjustment at the corresponding parts of the camera and the objective again take place simultaneously and in the same sense.

From the view point that the play between the individual members of a gear train are always approximately the same, in the prescription given by the present invention any play is acceptable as not disturbing the accuracy of the setting. Only any difference which there may be between one and the other part of the gear train could have a detrimental influence, but this amount is so small that it is practically meaningless.

There is a further advantage that even the play in the operating member is only half the total play so that there is no significant idle movement even at this operating member.

In the case of bellows setting equipment in which a transmission bar is rotatably mounted at the guide frame, this bar is as a rule the central member of the gear train, and in accordance with a further proposal of the invention it is arranged that the operating member shall act on this transmission bar.

The operating member, which may be a disc, a lever or the like may for example be arranged directly on the transmission bar. It is possible however, and preferred in this invention, to arrange transmission toothed wheels between the operating member and the transmission bar. The play in these wheels has no detrimental influence on the precision of setting of the appropriate diaphragm value at the objective and at the camera. Moreover toothed wheels of this kind cater for an improved transmission and thereby facilitate very accurate setting of the diaphragm. It is advantageous, where the operating member referred to is a rotatable disc, to mount this on the rear standard. This brings the operating member in the vicinity of the other surface element of the camera, for example the trip button, and this simplifies the handling of the camera.

Figure 2:
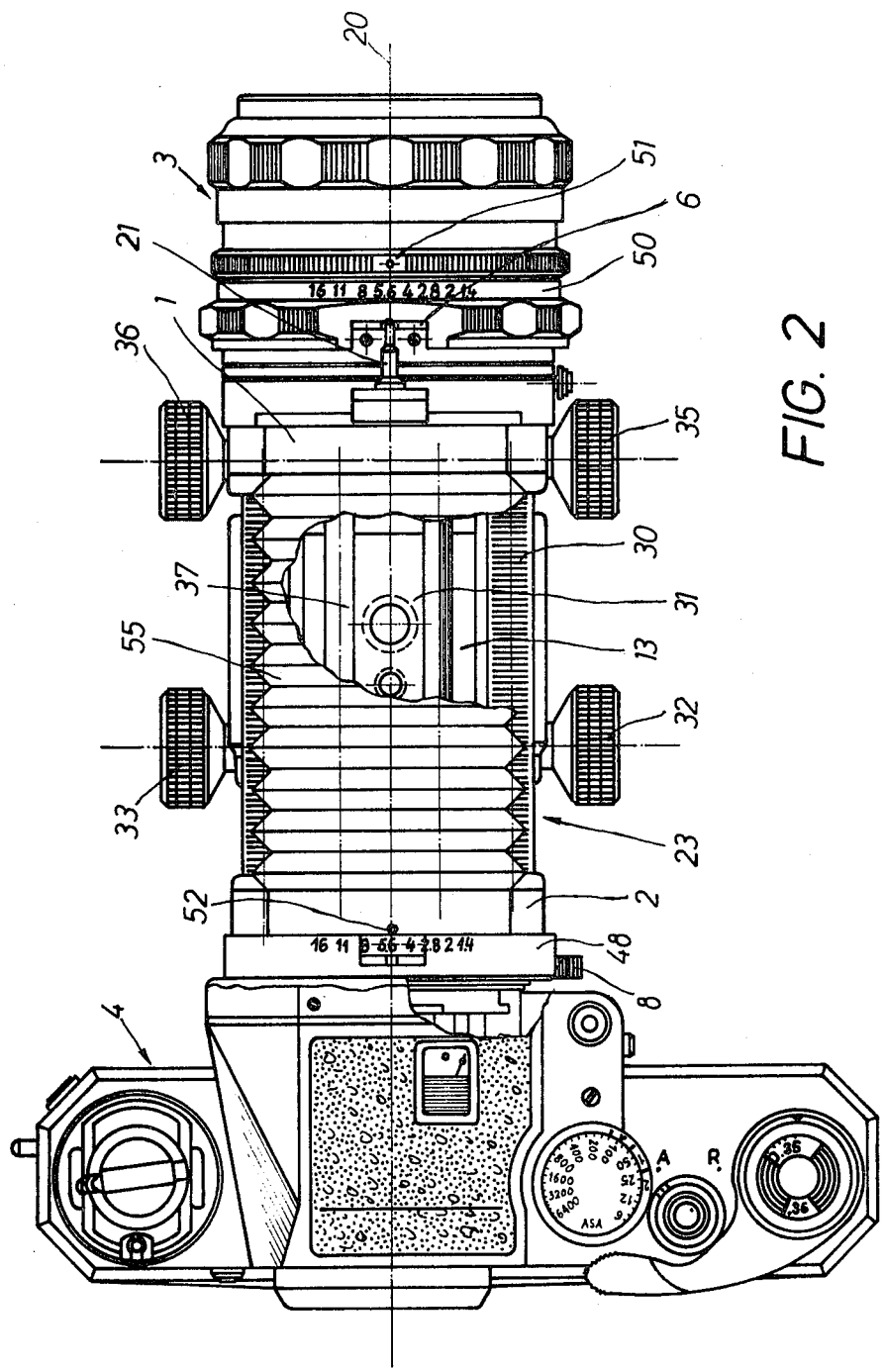
Figure 3:
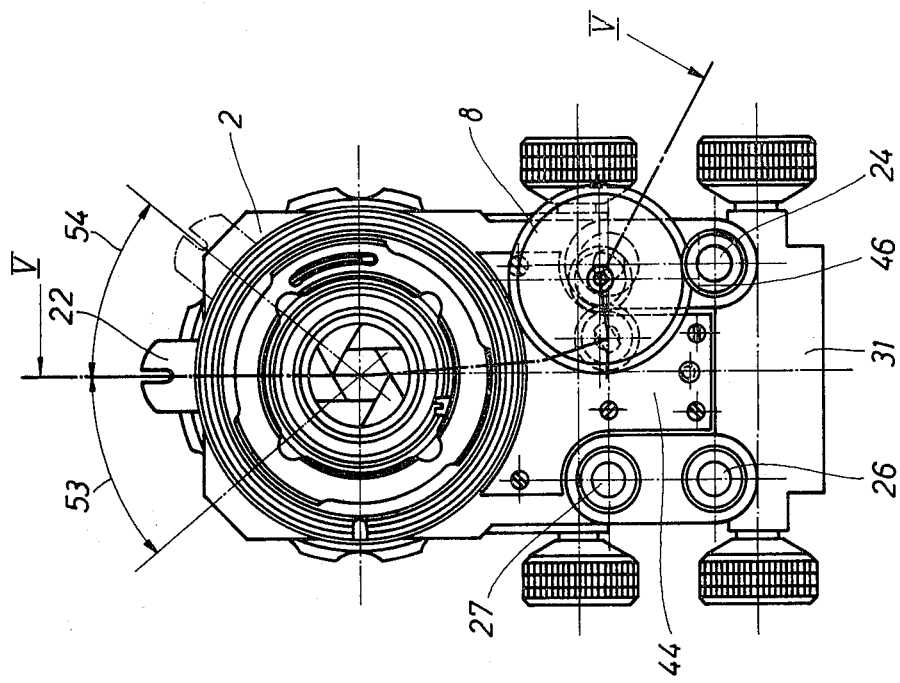
Figure 4:
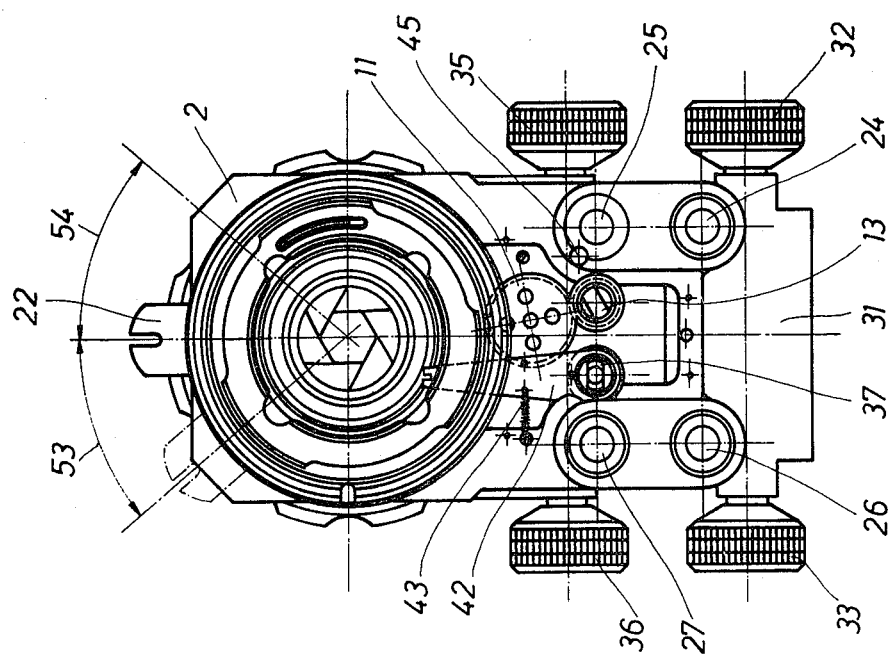
Figure 5:
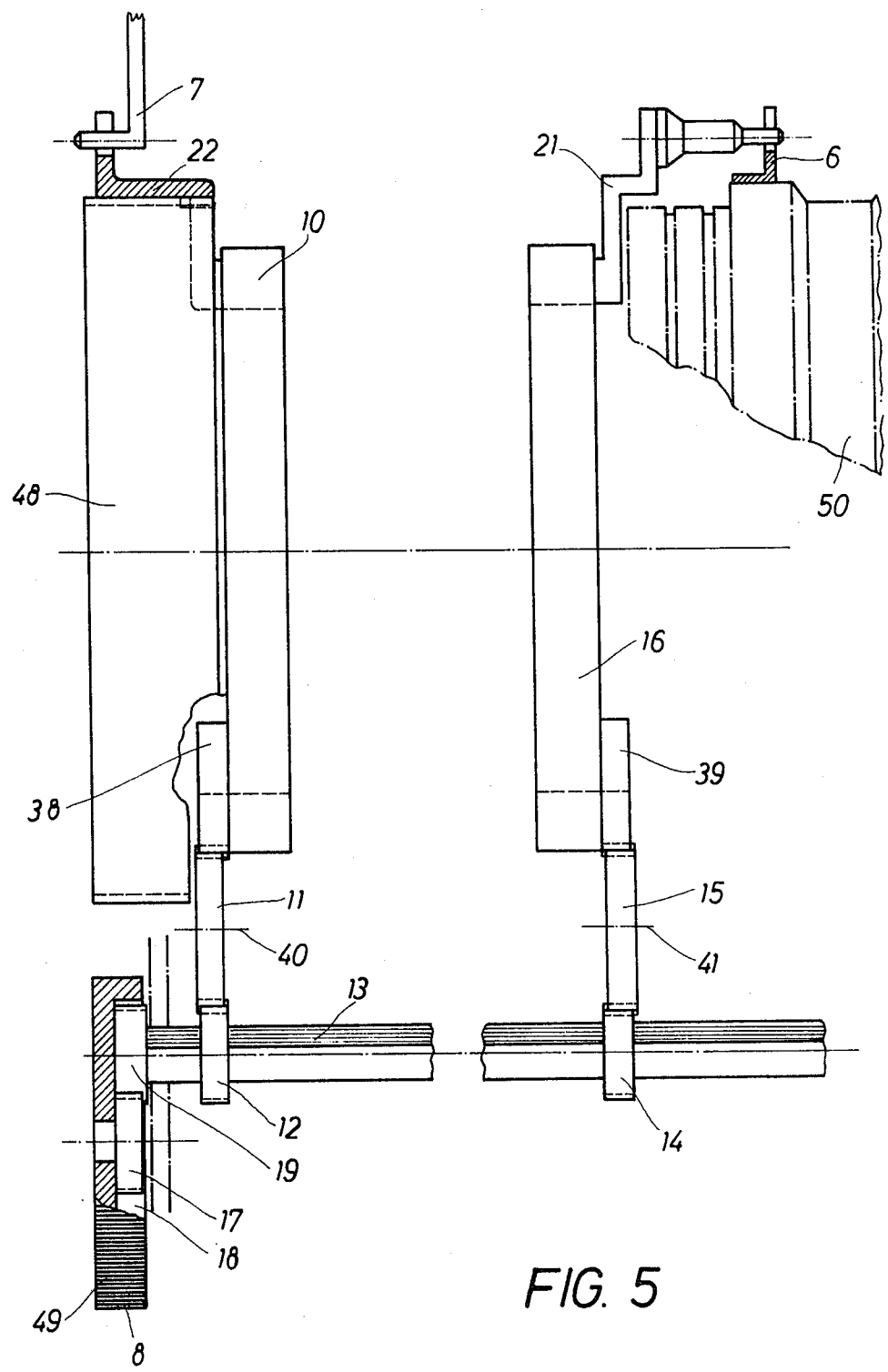

Preferred embodiments of the invention involving useful details thereof are diagrammatically illustrated in the accompanying drawings, in which:

FIG. 1 is a side view of a setting equipment according to the invention combined with a camera and an objective, FIG. 2 is a plan view of the apparatus illustrated in FIG. 1, FIG. 3 is an elevational view of the rear standard of the setting equipment with the camera removed, some parts of the standard being omitted, FIG. 4 is an illustration corresponding to that of FIG. 3 with further parts omitted, and FIG. 5 is an enlarged diagammatic illustration of parts of the bellows setting equipment.

The section line V — V in FIG. 3 designates the position of the parts shown in FIG. 5.

The bellows setting equipment 23 essentially comprises a front standard 1 and a rear standard 2 connected by a guide frame 5. The front standard 1 carries the objective 3 and the rear standard 2 the associated camera 4. A bellows 55 extends between the standards 1 and 2.

Details of the objective and the camera are not described in detail below because these details are known per se. This applies in particular to the construction of all the elements controlling, or controlled by, the diaphragm, these being partially arranged within the objective and within the camera respectively. The present invention is concerned only with the equipment for setting the bellows and thus parts of the bellows setting equipment which couple these control elements of the camera and the objective. The element 7 pertaining to the control elements of the camera and the element 6 representing the control elements of the objective are shown in more particularity in FIGS. 1 and 5.

In the embodiment illustrated the guide frame 5 is basically made up of an arrangement of four parallel guide rods 24, 25, 26 and 27 which are connected together at their leading ends by a plate 28, whilst the rear ends of these rods are held together by the lower part 29 of the rear standard 2.

Each of the guide rods is provided with teeth 30, for example as can be seen from FIG. 2. The two lower rods 24 and 26 serve to guide a carriage 31, for example for fastening the bellows setting equipment to a tripod, and this carriage 31 is movable in the direction of the optical axis 20 by means of operating members 32 and 33 and the bellows setting equipment moved relatively to the carriage along the guide rods 24 and 26.

A further carriage 34 is guided by the two upper rods 25 and 27 which are in turn provided with operating members 35 and 36 so as to be movable relatively to the guide rods in the direction of the optical axis. This carriage 34 constitutes the lower part of the front standard 1 and is structurally combined therewith.

Two operating bars 13 and 37 are disposed between the two upper guide rods 25 and 27 and parallel to the latter, as can be seen particularly from FIG. 2. The rear ends of the operating bars 13 and 37 are mounted in the lower part 29 of the rear standards 2, whilst their leading ends are mounted in the plate 28. Both bars 13 and 37 are rotatable and are of a polygonal form, as can be seen particularly from FIG. 4.

Guided on the two operating bars 37 and 13 within the carriage 34 are short sleeves with toothed wheels which slide along the bars 13 and 37 when the carriage 34 moves, whereby a rotary movement initiated at the rear ends on the operating bars 13 and 37 can be applied through the sleeves and toothed wheels to the front standard 1. In the embodiment illustrated the operating bar 37 is used to transmit the movements required during the shutter-release operation, that is to say for example the movement which adjusts the diaphragm to the preselected stop value and the diaphragm is re-opened to its full value after the exposure. The function of this operating bar 37 and the associated devices is known.

The function of the operating bar 13 will be described in more detail below.

Mounted in the rear standard 2 is a drive ring 10 capable of being rotated around the optical axis 20. This ring 10 is diagrammatically illustrated in FIG. 5 with the surrounding standard omitted.

The drive ring 10 has a coupling element 22 with a forked upper end projecting from the standard, as will be seen for example from FIGS. 3 and 4. This coupling element cooperates with the control element 7 projecting from the camera 4. It will be apparent that any movement of the coupling element 22 is transmitted to the control element 7.

A similar drive ring 16 is rotatably mounted in the front standard 1 and is connected to the coupling element 22 operating on the control element 6 in the objective 3. By this means the drive ring 16, when rotated, carries the control element 6 with it through the coupling element 21 and operates the objective 3 in the appropriate sense, for example a diaphragm value is preselected.

Each of the two drive rings 10 and 16 is provided with a toothed segment 38 and 39 respectively and an intermediate toothed wheel 11 and 15 rotatable about pins 40 and 41 are respectively rotatably mounted in the lower part 29 of the standard 2 and in the carriage 34 of standard 1, whereby this rotary movement is respectively transmitted to the toothed wheel 12 and the toothed wheel 14. These wheels 12 and 14 in the rear and front standards 2 and 1 are each held against rotation on the operating bar 13 so that the toothed wheel 14, as mentioned above, is in a position to perform a shifting movement of the carriage 34, whilst the toothed wheel 12 is immovable in relation to the operating bar 13.

From the above description it will be understood that a rotation of the operating rod brings about a like movement of the toothed wheels 12 and 14 and then the toothed wheels 11 and 15, resulting in movement of the drive rings 10 and 16, this finally producing a like movement of the control elements 7 and 6.

FIG. 4 shows the position of the toothed wheel 11 and toothed wheel 12 at the lower end of the operating bar 13. Mounted at the rear end of the operating bar 37 is a lever 42 which is subject to the action of a spring 43, and like elements are provided in the front standard 1 for the operating bar 37 and these, as already stated, are of auxiliary importance within the invention.

The space for housing the lever 42 and the toothed wheels 11 and 12 is, as can be seen particularly from FIG. 3, covered by a plate 44 and the disc 8 is rotatably mounted on a bearing pin for which a hole 45 (see FIG. 4) is provided. This disc 8 has a cavity 18 accommodating the two pinions 17 and 19. Pinion 17 is rigidly connected to disc 8 and operates pinion 19, which latter is arranged on the end of the operating bar 13.

To cater for the installation of as large a disc 8 as possible a recess 46 is provided in the rear end of the guide rod 24 for engagement with this disc 8. The rear end of guide bar 25 is somewhat foreshortened to provide space for disc 8.

Disc 8 furthermore is held by a further cover 47 of the housing which is depicted in FIG. 1 by dotted lines, but is not fully illustrated in the latter.

The coupling element 2 carried by drive ring 10 in turn carries a ring 14 which participate in the rotary movement of the drive ring 10 round the optical axis 20 and has the stop value marked on it. Ring 48 serves for optical control of the correct function but could be omitted in a practical embodiment of the invention.

It is to be noted that the forms of the drive rings 10 and 16 shown in the drawing can of course, be transposed. Instead of rings which completely enclose the optical axis part rings or sectors could be used or a gearing can be provided by other gear members, lever arms or the like between the coupling elements 21 and 22.

When the setting equipment as described above is operated the following occurs.

The disc-form operating member has milling at its outer periphery 49 and a specific stop value can be set at the objective 3, through the arrangement described, by turning disc 8. The drive ring 16 can for example be turned, and with it scale 50, to bring a specific value opposite the reading mark 51. The range of adjustment of the coupling part 22 is indicated in FIGS. 4 and 5 by arrows 53 and 54 respectively.

The drive ring 10 is also turned, independent of any play, and therewith the control element, and with it the ring 49 which carries the same scale. The same set diaphragm value then appears opposite the reading mark 52. The settings of the control elements 6 and 7 conform exactly to one another.

If the camera and the objective are used without the bellows setting equipment, and if the objective 3 is engaged on the camera by bayonet fastening means, the control element 6, which is of forked form in the same manner as coupling element 22, engages over the control element 7 of camera 4.

I claim:

1. In equipment for setting the bellows between a camera and a relatively movable objective in front of said camera, this equipment being of the kind comprising a front standard for connection to the objective, a rear standard for connection to the camera, a guide frame on which said front and rear standards are mounted for relative adjustment to vary the spacing between them, and an assembly including a gear train associated with said standards and said guide frame for coupling diaphragm control elements associated respectively with the objective and with the camera, the improvement which consists in the provision of a member for coordinated operation of said control elements, said operating member acting on an intermediate element of said gear train.

2. Setting equipment according to claim 1, in which said gear train includes a transmission bar, and said operating member acts directly on said bar.

3. Setting equipment according to claim 2, in which said operating member is a disc rotatably mounted on the said rear standard.

4. Setting equipment according to claim 3, in which toothed transmission wheels are connected between said disc and said transmission bar.

5. Setting equipment according to claim 4, in which said disc is formed with a cavity and a pair of intermeshing pinions are mounted in said cavity, one said pinion being connected to said disc and the other pinion being fastened to said transmission bar.

6. Setting equipment according to claim 1, in which said gear train includes a transmission bar, a drive ring is rotatably mounted on each said front standard and said rear standard substantially coaxial with the optical axis of the camera and the objective, each said drive ring is operatively connected to said transmission bar through elements of said gear train, and each said drive ring carries an outwardly-projecting coupling element.

7. Setting equipment according to claim 6, in which each drive ring is mounted in the corresponding standard with its coupling element projecting outwards from said standard.

8. Setting eqiupment according to claim 7, in which each said coupling element is operatively associated with the control elements of the objective and the camera respectively.

9. Setting equipment according to claim 8, in which each said drive ring is operatively connected to said transmission bar through an intermediate toothed wheel in engagement with a pinion carried by said bar.

10. Setting equipment according to claim 1, in which the transmission members of said gear train are of substantially like form in the front and rear standards.

* * * * *